US011498624B2

(12) United States Patent
Song (10) Patent No.: US 11,498,624 B2
(45) Date of Patent: Nov. 15, 2022

(54) FRAME CONNECTION STRUCTURE AND METHOD FOR THE SAME

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/345,682

(22) Filed: Jun. 11, 2021

(65) Prior Publication Data

US 2022/0185389 A1    Jun. 16, 2022

(30) Foreign Application Priority Data

Dec. 16, 2020  (KR) ........................ 10-2020-0176380

(51) Int. Cl.
  *B62D 27/02*  (2006.01)
  *B62D 25/04*  (2006.01)
  *B62D 25/06*  (2006.01)
  *B62D 25/02*  (2006.01)

(52) U.S. Cl.
CPC .......... *B62D 27/023* (2013.01); *B62D 25/025* (2013.01); *B62D 25/04* (2013.01); *B62D 25/06* (2013.01)

(58) Field of Classification Search
CPC ....... B62D 25/023; B62D 25/04; B62D 25/06
USPC ..... 296/193.06, 210, 203.01, 203.03, 29, 30
See application file for complete search history.

(56) References Cited

U.S. PATENT DOCUMENTS

2021/0354248 A1* 11/2021 Fujimoto ............... B23K 26/21

FOREIGN PATENT DOCUMENTS

CN      105377674 A  *  3/2016  ............. B62D 25/04
JP        6183473 B2  *  8/2017  ............. B62D 25/04

* cited by examiner

*Primary Examiner* — Dennis H Pedder
(74) *Attorney, Agent, or Firm* — Slater Matsil, LLP (57) ABSTRACT

An embodiment frame connection structure includes a first body member including an inner portion and an outer portion integrally connected to each other along a transverse direction to form a first closed cross-section and at least one flange extending from the inner portion and the outer portion. It further includes a second body member including an inner portion and an outer portion integrally connected along a longitudinal direction to form a second closed cross-section, wherein the second body member is spot welded to the at least one flange of the first body member.

14 Claims, 13 Drawing Sheets

FRAME CONNECTION STRUCTURE AND METHOD FOR THE SAME

CROSS-REFERENCE TO RELATED APPLICATIONS

This application claims the benefit of Korean Patent Application No. 10-2020-0176380, filed on Dec. 16, 2020, which application is hereby incorporated herein by reference.

TECHNICAL FIELD

The present invention relates to a frame connection structure.

BACKGROUND

In general, a frame is a part that installs various devices or vehicle bodies constituting a chassis, and is a structure that corresponds to the skeleton of a vehicle that supports the load transmitted from the vehicle body and the reaction force of the front and rear axles.

A space frame is a type of frame that forms a skeleton by connecting steel plates or pipes, and has a merit that it is light and high in strength.

In this space frame, the members are responsible for all the loads applied to the vehicle body, and for this reason, securing the connection of the members is more important than anything else.

Generally, the members of the space frame are connected by $CO_2$ welding or bolting, but these methods are somewhat disadvantageous in terms of securing productivity, cost and quality.

The above information disclosed in this Background section is only for enhancement of understanding of the background of the invention, and therefore it may contain information that does not form the prior art that is already known to a person of ordinary skill in the art.

SUMMARY

The present invention relates to a frame connection structure. Particular embodiments relate to a frame connection structure and method of a vehicle.

Embodiments of the present invention have been made in an effort to provide a connection structure and method of a frame of which members with closed cross-sections may be joined by spot welding.

A frame connection structure according to an exemplary embodiment of the present invention may include a first body member including an inner portion and an outer portion integrally connected to each other along a transverse direction to form a first closed cross-section, and including at least one flange extending from the inner portion and the outer portion, and a second body member in which an inner portion and an outer portion are integrally connected along the longitudinal direction to form a second closed cross-section, and spot welded to the flange of the first body member.

The frame connection structure may further include a joint connected to the inner portion of the first body member and the inner portion of the second body member.

The flange of the first body member may include a first flange extending in the up and down directions from the inner portion and the outer portion, and a second flange extending in the vehicle width direction from the inner portion and the outer portion.

The first and second flanges of the first body member may be formed by curling of the inner portion and outer portion flat.

The outer portion of the second body member may be spot welded to the first flange of the first body member, and the panel may be spot welded to the second flange of the first body member.

The joint may include a first portion spot welded to the second flange of the first body member, and a second portion bent from the first portion and spot welded to the inner portion of the second body member.

The second body member may include a first junction end formed on the outer portion and spot welded to the flange of the first body member, and a second junction end formed on the inner portion and spot-welded to the joint.

The second junction end of the second body member may be disposed at a predetermined distance from the inner portion of the first body member, wherein a welding space may be formed between the second junction end of the second body member and the inner portion so that a spot welding gun enters therebetween.

The second body member may include at least one third flange extending from the inner portion and outer portion of the second body member.

The third flange of the second body member may extend from the inner portion and the outer portion of the second body member along the front and rear directions of the vehicle body, respectively.

The third flange may be formed by curling of the inner portion and the outer portion of the second body member flat.

The joint may include a first portion spot welded to the flange of the first body member, a second portion integrally connected to the first portion, spot welding to the second junction end of the second body member, and closing the welding space, and a third portion integrally connected to the second portion and spot welded to the third flange.

A frame connection method according to an exemplary embodiment of the present invention may include (a) by integrally connecting an inner portion and an outer portion along the lateral direction to form a first closed cross-section, forming a first body member including first and second flanges extending from the inner portion and the outer portion, (b) by integrally connecting an inner portion and an outer portion along the longitudinal direction to form a second closed cross-section, forming a second body member including a first junction end that is spot-welded to the flange portion of the first body member and formed in a planar shape at the end of the outer portion and a second junction end formed in a planar shape at an end of the inner portion, and (c) spot welding the first flange and the first junction end.

In the (c) process, spot welding the first flange and the first junction end may be performed through the welding space between the inner portion of the first body member and the second junction end.

After the (c) process, a joint may be spot welded to the second flange and the second junction end.

According to an exemplary embodiment of the present invention, the assembly productivity, assembly cost and assembly quality of the vehicle body are secured by connecting the joints with the first and second body members as a longitudinal frame and a transverse frame each having a closed cross-section by spot welding.

In addition, the effects obtained or predicted by exemplary embodiments of the present invention will be disclosed directly or implicitly in the detailed description of exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference only to explain exemplary embodiments of the present invention, the technical idea of the present invention should not be interpreted as being limited to the accompanying drawings.

The following elements may be used in connection with the drawings to describe embodiments of the present invention.

| | |
|---|---|
| 1: PBV vehicle | 3: under body |
| 5: upper body | 7: chassis frame |
| 10: first body member | 11, 31: inner portion |
| 13, 33: outer portion | 15: first closed cross-section |
| 17: first flange | 19: second flange |
| 21, 43: closed section | 30: second body member |
| 35: second closed cross-section | 37: first junction end |
| 39: second junction end | 41: third flange |
| 50: joint | 51: first portion |
| 52: second portion | 53: third portion |
| 61: panel | 71: spot welding gun |
| 81: welding space | 100: frame connection structure |

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe embodiments of the present invention, parts irrelevant to the description are omitted, and the same reference numerals are attached to the same or similar components throughout the specification.

Since the sizes and thicknesses of each component shown in the drawings are arbitrarily shown for convenience of description, the present invention is not necessarily limited to those shown in the drawings, and the thicknesses are enlarged to clearly express various parts and regions.

In addition, in the following detailed description, the names of the configurations are divided into first, second, etc. to distinguish the configurations in the same relationship, and are not necessarily limited to the order in the following description.

Throughout the specification, when a part includes a certain component, it means that other components may be further included rather than excluding other components unless specifically stated to the contrary.

In addition, terms such as . . . unit, . . . means, etc. described in the specification mean a unit of a comprehensive structure that performs at least one function or operation.

Figure 1:
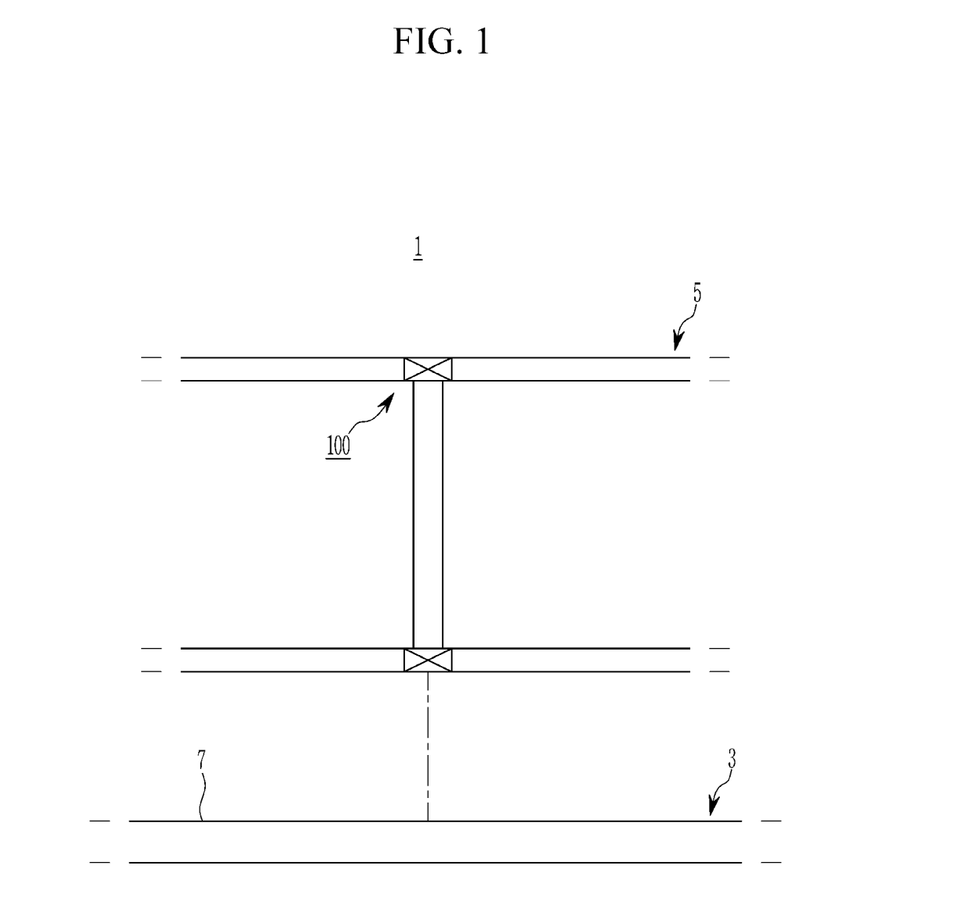
FIG. 1 is a drawing showing an example of a vehicle that can be applied to a frame connection structure according to an exemplary embodiment of the present invention.

FIG. 1 is a drawing showing an example of a vehicle that can be applied to a frame connection structure according to an exemplary embodiment of the present invention.

Referring to FIG. 1, a frame connection structure 100 according to an exemplary embodiment of the present invention may be applied to, for example, a purpose-based mobility vehicle (PBV) 1 based on an electric vehicle.

Here, the PBV 1 is an environment-friendly mobile vehicle that provides an occupant with a necessary customized service during the time it travels from the origin to the destination. The PBV 1 is capable of optimal path predetermination and cluster driving for each situation, and further, may be a box-type design vehicle with a large indoor space.

The PBV 1 like this includes a skateboard type under body 3 and an upper body 5 as a monocoque type vehicle body mounted on the under body 3.

The under body 3 is also referred to as a rolling chassis in the industry, and includes a chassis frame 7 on which a battery assembly (not shown in the drawing) can be mounted.

The upper body 5 is a body that is coupled to the under body 3, and may constitute a cabin. The upper body 5 may be, for example, a space frame formed by connecting a plurality of members such as a steel plate or a pipe to form a skeleton.

In the industry, the vehicle width direction is called the L direction, the vehicle body length direction (the direction before and after the vehicle body) is called the T direction, and the height direction of the vehicle body is called the H direction. However, in exemplary embodiments of the present invention, instead of setting the LTH direction as described above as the reference direction, the constituent elements in the following will be described by setting the vehicle width direction, the vehicle body length direction and the up and down directions.

In addition, the end (one end or the one end) in the following can be defined as either end, and is defined as a certain part (one end or the other end) including the end.

Further, in the following, the inner side can be defined as the inner side of the cabin constituting the vehicle cabin, the outer side is the outside of the cabin, the lateral direction is the front and rear direction of the vehicle body, and the vertical direction is the up and down direction.

Meanwhile, the frame connection structure 100 according to an exemplary embodiment of the present invention is a member connection structure of the upper body 5 as described above, and a structure in which members of a straight line type are connected to the front and rear directions and up and down directions of the vehicle body.

A connection structure 100 according to an exemplary embodiment of the present invention includes the members of the upper body 5, for example, a roof side, a side sill, and a connection structure of the pillar that connects the roof side and the side sill in the up and down directions. The frame connection structure 100 according to an exemplary embodiment of the present invention may include a connection structure connecting a predetermined panel to the members.

Hereinafter, an example of connecting the roof side and the upper part of the pillar will be described. Since the structure and method of connecting the side sill and the lower part of the pillar is the same as the structure and method of connecting the roof side and the upper part of the pillar, a detailed description will be omitted.

The frame connection structure 100 according to an exemplary embodiment of the present invention may be a structure in which members having closed cross-sections are combined by spot welding.

Figure 2A:
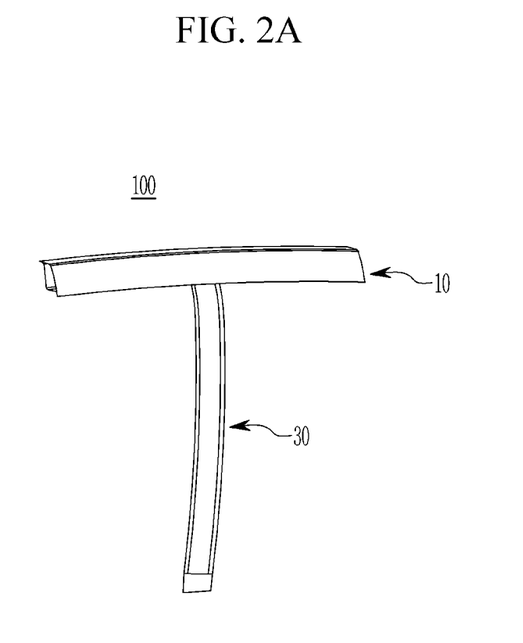
FIG. 2A and FIG. 2B are perspective views showing a frame connection structure according to an exemplary embodiment of the present invention.
Figure 2B:
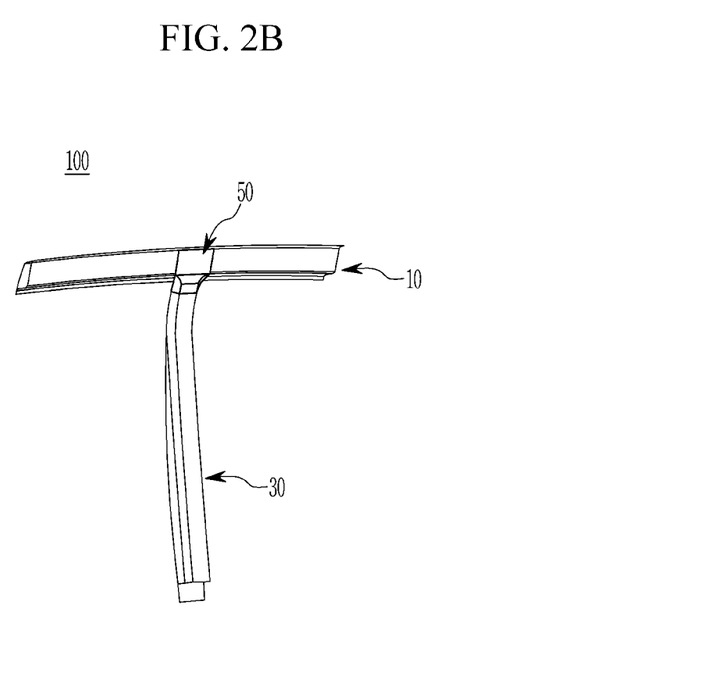

FIG. 2A and FIG. 2B are perspective views showing a frame connection structure according to an exemplary embodiment of the present invention.

Referring to FIG. 2A and FIG. 2B, the frame connection structure 100 according to an exemplary embodiment of the present invention may include a first body member 10, a second body member 30, and a joint 50.

Figure 3:
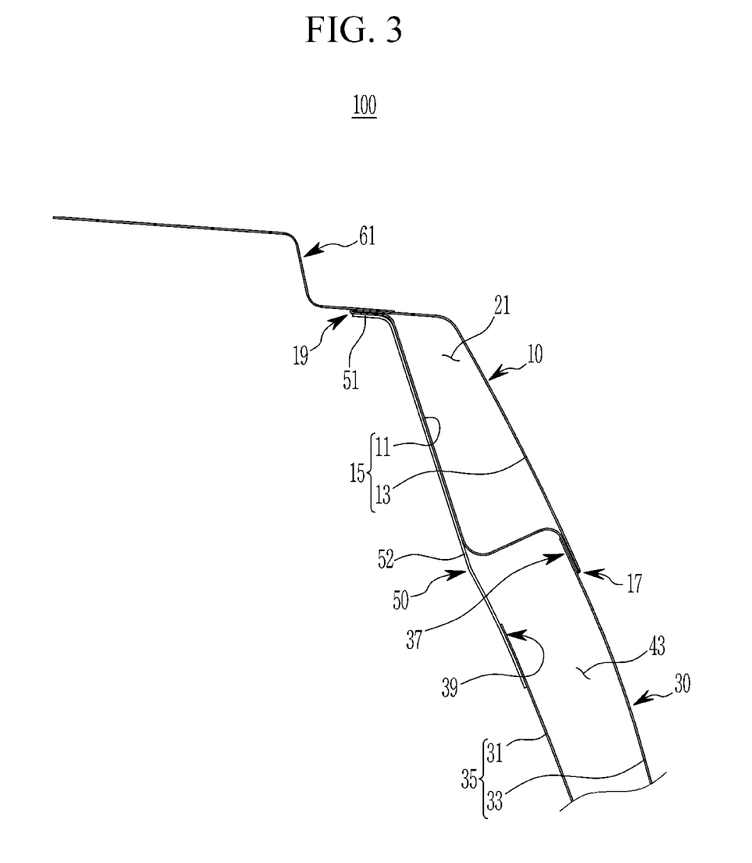
FIG. 3 is a cross-sectional view showing a frame connection structure according to an exemplary embodiment of the present invention.
Figure 4A:
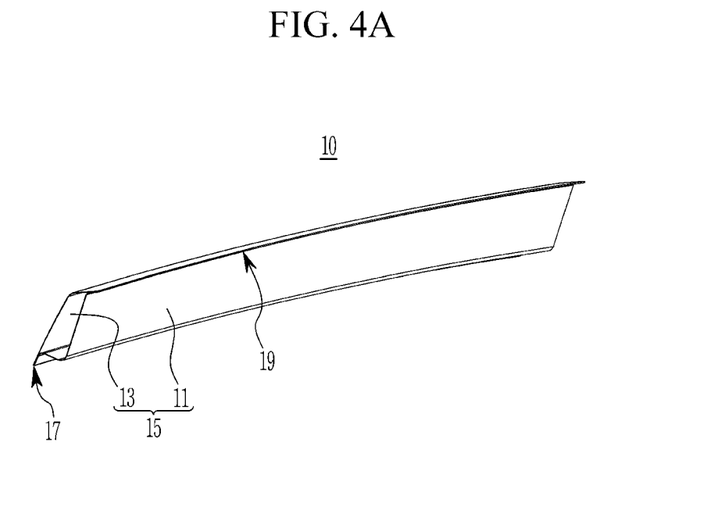
FIG. 4A and FIG. 4B are drawings showing a first body member applied to a frame connection structure according to an exemplary embodiment of the present invention.
Figure 4B:
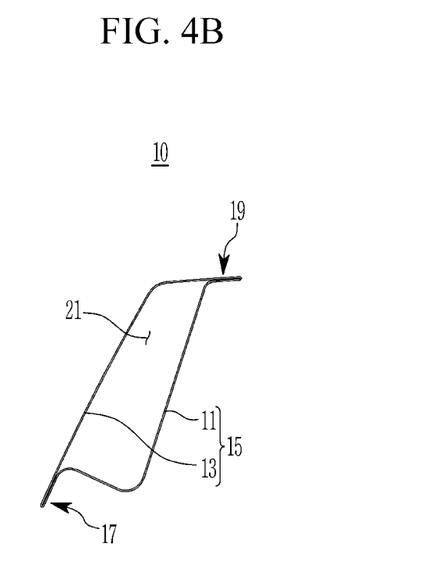

FIG. 3 is a cross-sectional view showing a frame connection structure according to an exemplary embodiment of the present invention, and FIG. 4A and FIG. 4B are drawings showing a first body member applied to a frame connection structure according to an exemplary embodiment of the present invention.

Referring to FIG. 3, FIG. 4A and FIG. 4B, in an exemplary embodiment of the present invention, the first body member 10 is a transverse direction frame of the upper body 5 as shown in FIG. 1, and may be, for example, a frame formed by roll forming.

The first body member 10 includes an inner portion 11 and an outer portion 13, a first closed cross-section 15 formed by the combination of the inner portion 11 and the outer portion 13, and first and second flanges 17 and 19 extending from the inner portion 11 and the outer portion 13.

The first closed cross-section 15 may be formed as a closed section 21 of an approximately quadrangular shape along the transverse direction between the inner portion 11 and the outer portion 13.

The first flange 17 is formed to extend in the up and down directions from the inner portion 11 and the outer portion 13. The second flange 19 is formed to extend in the vehicle width direction from the inner portion 11 and the outer portion 13.

Here, the first and second flanges 17 and 19 are elongated along the transverse direction on both sides of the closed section 21 with the closed section 21 interposed therebetween. For example, the first and second flanges 17 and 19 are formed on the lower and upper sides of the first body member 10, respectively, based on the drawing.

These first and second flanges 17 and 19 may be formed in a form in which the inner portion 11 and the outer portion 13 are curled to be flat. That is, the first and second flanges 17 and 19 may be formed with flat flange faces.

Figure 5A:
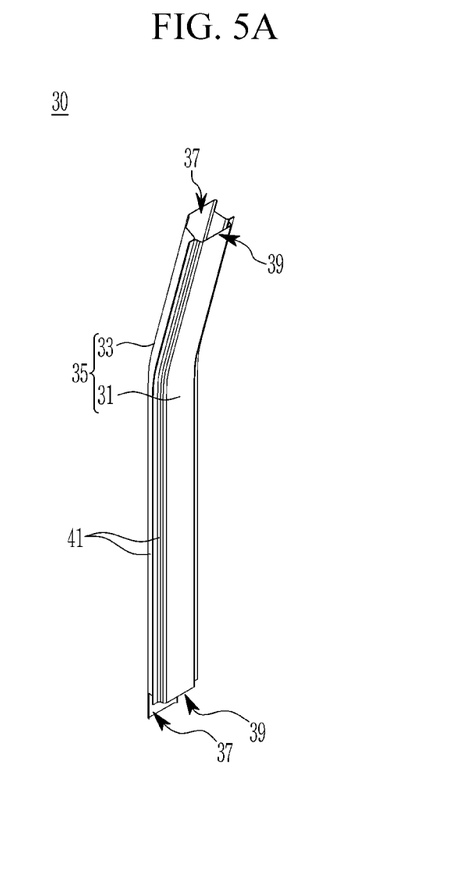
FIG. 5A and FIG. 5B are drawings showing a second body member applied to a frame connection structure according to an exemplary embodiment of the present invention.
Figure 5B:
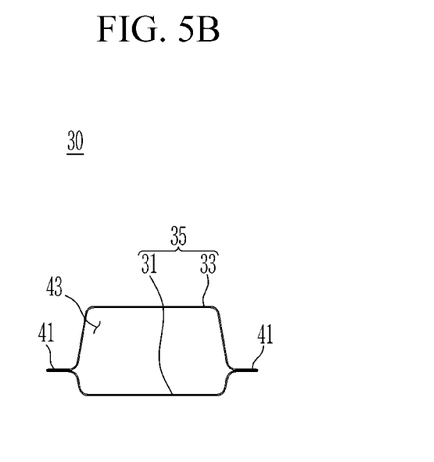

FIG. 5A and FIG. 5B are drawings showing a second body member applied to a frame connection structure according to an exemplary embodiment of the present invention.

Referring to FIG. 3, FIG. 5A and FIG. 5B, in an exemplary embodiment of the present invention, the second body member 30 is a vertical direction frame of the upper body 5 as shown in FIG. 1, and may be, for example, a frame formed by roll forming. The second body member 30 may be spot welded to the first flange 17 of the first body member 10.

The second body member 30 includes an inner portion 31 and an outer portion 33, a second closed cross-section 35 formed by the connection of the inner portion 31 and the outer portion 33, a first junction end 37 formed in the outer portion 33, a second junction end 39 formed in the inner portion 31, and a third flange 41 formed extending from the inner portion 31 and the outer portion 33.

The second closed cross-section 35 may be formed as a closed section 43 of an approximately quadrangular shape along the transverse direction between the inner portion 31 and the outer portion 33. Here, based on the lateral direction of the second body member 30, the outer portion 33 has a longer length than the inner portion 31. That is, the length between both ends along the longitudinal direction of the inner portion 31 is smaller than the length between both ends along the longitudinal direction of the outer portion 33.

The first junction end 37 is formed in a planar shape at the end of the outer portion 33 of the second body member 30, and may be spot welded to the first flange 17 of the first body member 10.

In addition, the second junction end 39 is formed in a planar shape provided at an end of the inner portion 31 of the second body member 30, and may be spot welded to the joint 50.

The third flange 41 may extend from the inner portion 31 and the outer portion 33 of the second body member 30 along the front and rear directions of the vehicle body, respectively.

Here, the third flange 41 may be formed to be elongated along the longitudinal direction at both sides of the closed section 43 along the closed section 43. This third flange 41 may be formed in a shape in which the inner portion 31 and the outer portion 33 are flatly curled. That is, the third flange 41 may be formed with a flat flange face.

Referring to FIG. 2A, FIG. 2B and FIG. 3, in an exemplary embodiment of the present invention, the joint 50 is for connecting the inner portion 11 of the first body member 10 and the inner portion 31 of the second body member 30.

The joint 50 is a panel part press-formed into a predetermined shape, and is connected to the inner portion 11 of the first body member 10 and the inner portion 31 of the second body member 30.

Figure 6:
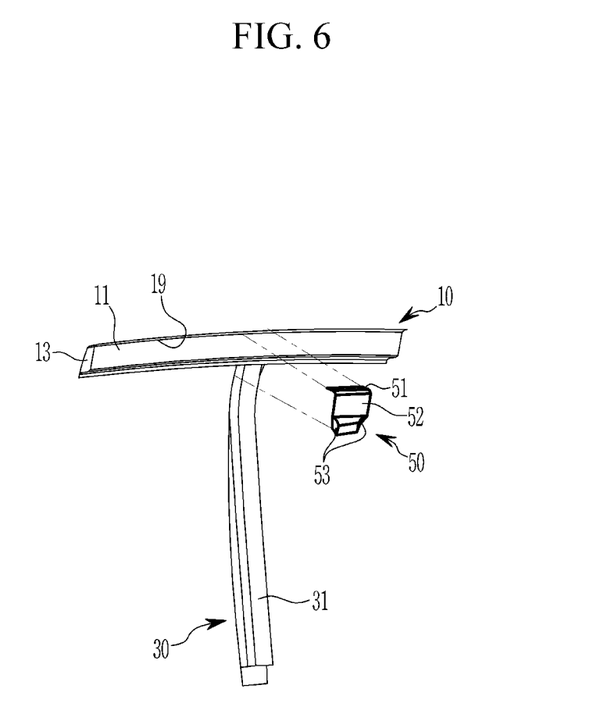
FIG. 6 is a drawing showing a joint applied to a frame connection structure according to an exemplary embodiment of the present invention.

FIG. 6 is a drawing showing a joint applied to a frame connection structure according to an exemplary embodiment of the present invention.

Referring to FIG. 3 and FIG. 6, in an exemplary embodiment of the present invention, the joint 50 includes a first portion 51, a second portion 52, and a third portion 53 that are integrally connected to each other.

The first portion 51 is spot welded to the second flange 19 of the first body member 10. The first portion 51 may be spot welded to the inner portion 11 side of the second flange 19.

The second portion 52 is bent from the first portion 51, and may be spot welded to the second junction end 39 of the second body member 30.

Figure 7:
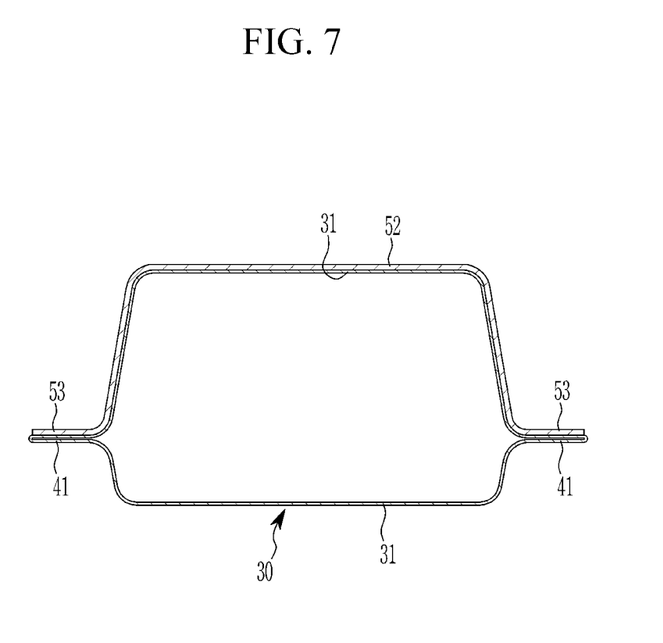
FIG. 7 is a drawing showing a joint state of a joint and a second body member applied to a frame connection structure according to an exemplary embodiment of the present invention.

And, the third portion 53 is formed bent from the second portion 52, as shown in FIG. 7, and it can be spot welded to the third flange 41 of the second body member 30.

Here, in a state in which the first portion 51 is spot welded to the inner portion 11 side of the second flange 19, a panel 61 including a roof panel may be spot welded to the outer portion 13 side of the second flange 19 as described above.

Hereinafter, a frame connection method (assembly method) of the frame connection structure 100 according to an exemplary embodiment of the present invention configured as described above will be described in detail with reference to accompanying drawings.

Figure 8:
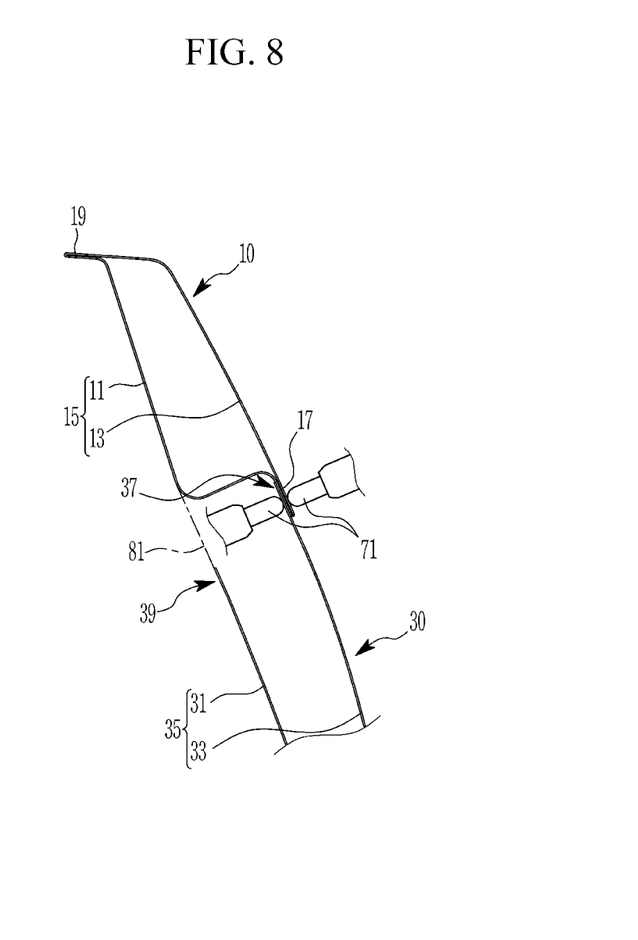
FIG. 8, FIG. 9 and FIG. 10 are drawings showing a frame connection method of a frame connection structure according to an exemplary embodiment of the present invention.
Figure 9:
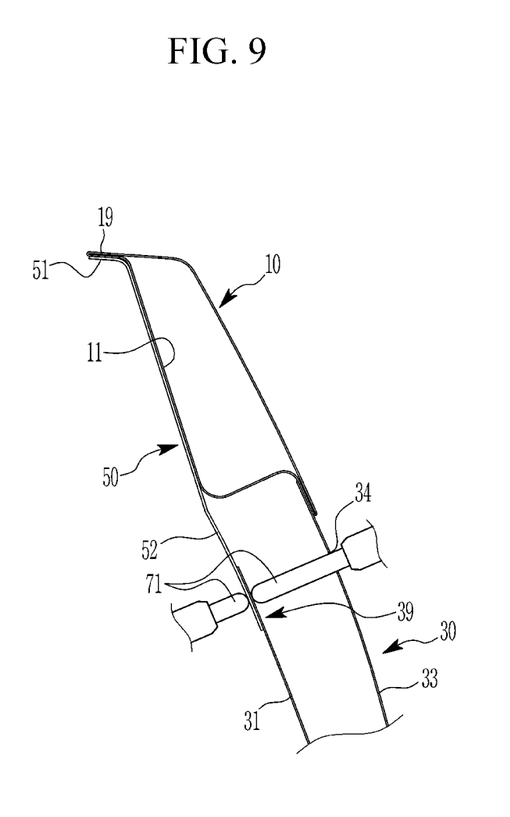
Figure 10:
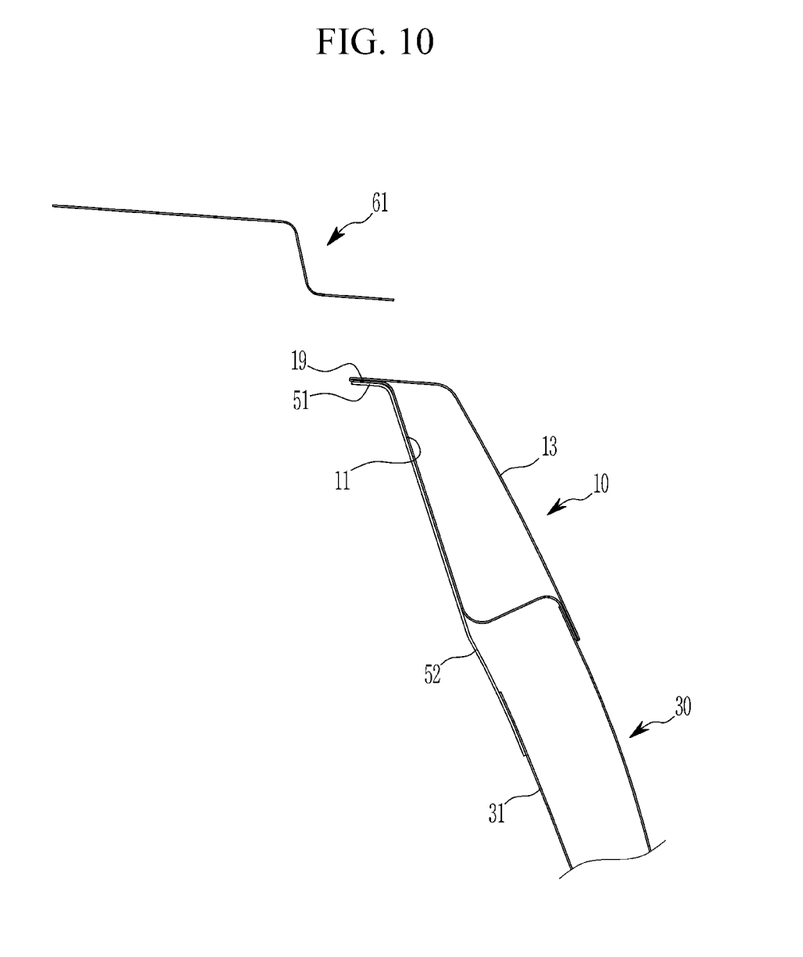

FIG. 8 to FIG. 10 are drawings showing a frame connection method of a frame connection structure according to an exemplary embodiment of the present invention.

Referring to FIG. 8, first, in an exemplary embodiment of the present invention, the first body member 10 to form the first closed cross-section 15 by connecting the inner portion 11 and the outer portion 13 including the first and second flange 17 and 19 is formed.

Then, the second body member 30 to form the second closed cross-section 35 by connecting the inner portion 31 and the outer portion 33 including the third flange 41 is formed.

The first junction end 37 of the second body member 30 is overlapped and matched to the side of the outer portion 13 of the first flange 17 of the first body member 10.

Here, since the outer portion 33 of the second body member 30 has a longer length than the inner portion 31, the second junction end 39 is disposed at a predetermined distance from the inner portion 11 of the first body member 10 and the welding space 81 is formed between the inner portion 11 and the second junction end 39.

Then, a spot welding gun 71 enters through a welding space 81, so that the first flange 17 and the first junction end 37 may be spot welded through the spot welding gun 71.

Next, in an exemplary embodiment of the present invention as shown in FIG. 9, the joint 50 is spot welded to the second flange 19 of the first body member 10 and the second junction end 39 of the second body member 30.

In this process, the first portion 51 of the joint 50 is spot welded to the inner portion 11 of the second flange 19. And, in an exemplary embodiment of the present invention, the second portion 52 of the joint 50 is spot-welded to the second junction end 39, and the welding space 81 is closed through the second portion 52.

Here, in an exemplary embodiment of the present invention, the spot welding gun 71 enters the inside of the second body member 30 through a passing hole 34 formed in the outer portion 33 of the second body member 30, and thus the second junction end 39 and the second portion 52 of the joint 50 may be spot welded.

Then, in an exemplary embodiment of the present invention as shown in FIG. 7, the third portion 53 of the joint 50 is spot welded to the third flange 41 of the second body member 30.

Subsequently, in an exemplary embodiment of the present invention as shown in FIG. 10, on the outer portion 13 side of the second flange 19, a panel 61, such as a roof panel, is spot welded along the front and rear directions of the vehicle body.

According to the frame connection structure and method according to an exemplary embodiment of the present invention as described so far, the first body member 10 as a horizontal frame and the second body member 30 as a vertical frame are connected by spot welding.

Therefore, in an exemplary embodiment of the present invention, it is possible to secure assembly productivity, assembly cost and assembly quality of the vehicle body without connecting the members of the frame by $CO_2$ welding or bolting.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A frame connection structure comprising:
    a first body member including:
        an inner portion and an outer portion integrally connected to each other along a transverse direction to form a first closed cross-section; and
        at least one flange extending from the inner portion and the outer portion;
    a second body member including:
        an inner portion and an outer portion integrally connected along a longitudinal direction to form a second closed cross-section, wherein the second body member is spot welded to the at least one flange of the first body member;
        a first junction end formed on the outer portion of the second body member and spot welded to the at least one flange of the first body member; and
        a second junction end formed on the inner portion of the second body member; and
    a joint connected to the inner portion of the first body member and the inner portion of the second body member, wherein the second junction end of the second body member is spot-welded to the joint,
    wherein the second junction end of the second body member is disposed at a predetermined distance from the inner portion of the first body member; and
    wherein a welding space is formed between the second junction end of the second body member and the inner portion of the first body member.

2. The frame connection structure of claim 1, wherein the welding space is configured to allow a spot welding gun to enter between the second junction end of the second body member and the inner portion of the first body member.

3. The frame connection structure of claim 1, wherein the second body member further comprises at least one second flange extending from the inner portion and the outer portion of the second body member.

4. The frame connection structure of claim 3, wherein the at least one second flange of the second body member extends from the inner portion and the outer portion of the second body member along front and rear directions of a vehicle body, respectively.

5. The frame connection structure of claim 3, wherein the at least one second flange is formed by curling of the inner portion and the outer portion of the second body member flat.

6. The frame connection structure of claim 3, wherein the joint comprises:
    a first portion spot welded to the at least one flange of the first body member;
    a second portion integrally connected to the first portion, wherein the second portion is spot welded to the second junction end of the second body member to close the welding space; and a third portion integrally connected to the second portion and spot welded to the at least one second flange.

7. A frame connection method comprising:
forming a first body member comprising an inner portion and an outer portion integrally connected along a lateral direction to form a first closed cross-section, wherein the first body member includes first and second flanges extending from the inner portion and the outer portion;
forming a second body member comprising an inner portion and an outer portion integrally connected along a longitudinal direction to form a second closed cross-section, the second body member including a first junction end that is spot-welded to the first flange of the first body member and formed in a planar shape at an end of the outer portion of the second body member and a second junction end formed in a planar shape at an end of the inner portion of the second body member; and
spot welding the first flange and the first junction end, wherein spot welding the first flange and the first junction end is performed through a welding space between the inner portion of the first body member and the second junction end.

8. The frame connection method of claim 7, further comprising spot welding a joint to the second flange and the second junction end.

9. The frame connection method of claim 8, wherein the joint comprises:
a first portion spot welded to the second flange of the first body member;
a second portion integrally connected to the first portion, wherein the second portion is spot welded to the second junction end of the second body member to close the welding space; and
a third portion integrally connected to the second portion and spot welded to a third flange.

10. The frame connection method of claim 8, further comprising spot welding a panel to the second flange of the first body member.

11. A frame connection structure comprising:
a first body member including:
an inner portion and an outer portion integrally connected to each other along a transverse direction to form a first closed cross-section; and
at least one flange extending from the inner portion and the outer portion;
a second body member including:
an inner portion and an outer portion integrally connected along a longitudinal direction to form a second closed cross-section, wherein the second body member is spot welded to the at least one flange of the first body member;
a first junction end formed on the outer portion of the second body member and spot welded to the at least one flange of the first body member; and
a second junction end formed on the inner portion of the second body member; and
a joint connected to the inner portion of the first body member and the inner portion of the second body member, wherein the second junction end of the second body member is spot-welded to the joint,
wherein the second junction end of the second body member is disposed at a predetermined distance from the inner portion of the first body member;
wherein a welding space is formed between the second junction end of the second body member and the inner portion of the first body member;
wherein the welding space is configured to allow a spot welding gun to enter between the second junction end of the second body member and the inner portion of the first body member; and
wherein the second body member further comprises at least one second flange extending from the inner portion and the outer portion of the second body member.

12. The frame connection structure of claim 11, wherein the at least one second flange of the second body member extends from the inner portion and the outer portion of the second body member along front and rear directions of a vehicle body, respectively.

13. The frame connection structure of claim 11, wherein the at least one second flange is formed by curling of the inner portion and the outer portion of the second body member flat.

14. The frame connection structure of claim 11, wherein the joint comprises:
a first portion spot welded to the at least one flange of the first body member;
a second portion integrally connected to the first portion, wherein the second portion is spot welded to the second junction end of the second body member to close the welding space; and
a third portion integrally connected to the second portion and spot welded to the at least one second flange.

* * * * *